United States Patent
Jenkins et al.

(10) Patent No.: US 11,370,555 B2
(45) Date of Patent: Jun. 28, 2022

(54) SYSTEMS AND METHODS FOR STOPPING MOVEMENT OF OPERATIONAL MEMBERS

(71) Applicant: Wing Aviation LLC, Mountain View, CA (US)

(72) Inventors: Kevin Jenkins, Mountain View, CA (US); André Prager, Mountain View, CA (US); Brandon Jones, Mountain View, CA (US); John FitzSimons, Mountain View, CA (US)

(73) Assignee: WING AVIATION LLC, Mountain View, CA (US)

( * ) Notice: Subject to any disclaimer, the term of this patent is extended or adjusted under 35 U.S.C. 154(b) by 366 days.

(21) Appl. No.: 16/729,167

(22) Filed: Dec. 27, 2019

(65) Prior Publication Data
US 2021/0197977 A1    Jul. 1, 2021

(51) Int. Cl.
*B64D 27/24* (2006.01)
*B64C 39/02* (2006.01)
*B64C 27/68* (2006.01)
*H01R 4/56* (2006.01)

(52) U.S. Cl.
CPC ............ *B64D 27/24* (2013.01); *B64C 27/68* (2013.01); *B64C 39/024* (2013.01); *B64C 2201/042* (2013.01); *B64C 2201/108* (2013.01); *B64D 2221/00* (2013.01); *H01R 4/56* (2013.01)

(58) Field of Classification Search
CPC .... B64D 27/24; B64D 2221/00; B64C 27/68; B64C 2201/042; B64C 2201/108; H01R 4/56
See application file for complete search history.

(56) References Cited

U.S. PATENT DOCUMENTS

| | | |
|---|---|---|
| 2017/0106986 A1 | 4/2017 | Sweeny et al. |
| 2018/0186464 A1 | 7/2018 | Woodworth et al. |
| 2019/0370509 A1 | 12/2019 | Ankney et al. |

FOREIGN PATENT DOCUMENTS

| | | |
|---|---|---|
| KR | 20140099771 | 8/2014 |
| WO | 2017/000238 | 1/2017 |

*Primary Examiner* — Robert L Deberadinis
(74) *Attorney, Agent, or Firm* — McDonnell Boehnen Hulbert & Berghoff LLP

(57) ABSTRACT

A method is provided that includes causing an operational member of a system to move. The method includes driving a power or control signal through a conductive coupling member. The conductive coupling member is connected between a first terminal and a second terminal in a power circuit, and the coupling member secures the operational member to a structural member of the system. The method includes detecting an electrical disconnect between the first terminal and a second terminal. The method includes determining a mechanical break associated with the coupling member based on the electrical disconnect between the first terminal and the second terminal. The method includes causing the operational member of the system to stop moving based on determining the mechanical break associated with the coupling member.

20 Claims, 10 Drawing Sheets

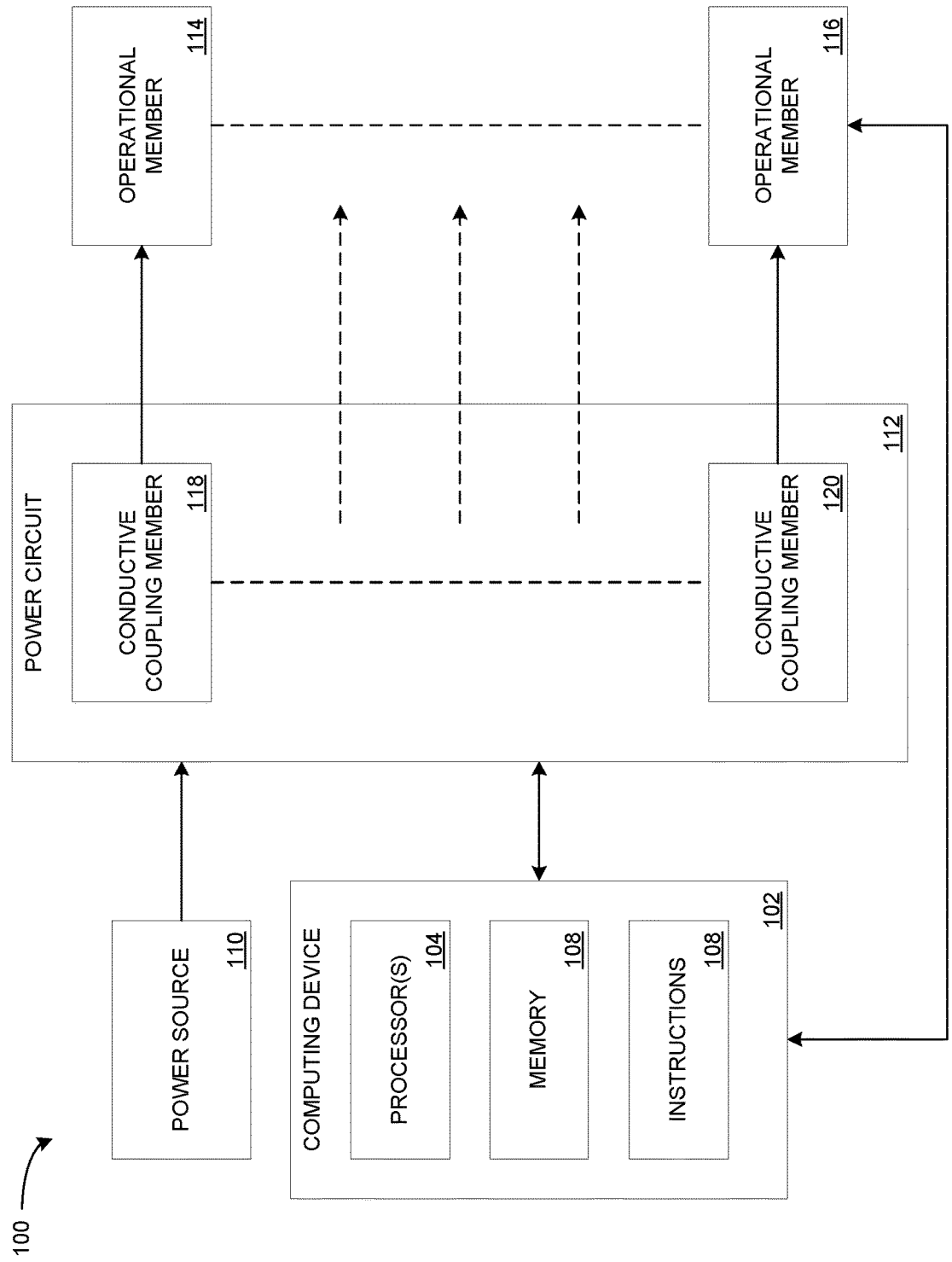

SYSTEMS AND METHODS FOR STOPPING MOVEMENT OF OPERATIONAL MEMBERS

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

Systems such as UAVs, or more generally, aerial vehicles, may have operational members that move to facilitate functions being performed. For example, in an aerial vehicle, a motor may move a propeller and cause lift in the aerial vehicle. For example, this may allow for a UAV to perform delivery operations. In some contexts, a coupling member, such as a screw, strap, clip, or the like, may break or come loose, and cause one or more operational members to become unsecured from a structural member, such as a boom arm of the UAV. In these scenarios, the operational member may continue to move, but because it is unsecured from the structural member, does not operate as anticipated. This may negatively affect other parts of the system by introducing ambiguity in the operation of at least one component of the system.

As a result, it would be desirable to cause an operational member secured to a structural member by using a coupling member to stop moving responsive to a mechanical break of the coupling member. This may advantageously allow for the system to operate more predictably, perhaps while taking one or more actions responsive to detecting the mechanical break.

SUMMARY

The present embodiments advantageously provide an aerial vehicle, method, and system in which an operational member stops moving responsive to a mechanical break in a coupling member. A power circuit is used to provide a power or control signal to the operational member. The power circuit includes a conductive coupling member. The coupling member is situated in the power circuit such that, if the coupling member experiences a mechanical break, the operational member stops receiving aspects of the power or control signal and responsively stops moving.

Within examples, the operational member includes a motor configured to move a propeller and the coupling member includes a screw. The screw can be composed of a conductive metal and can be used as part of the power circuit. If the threads of the screw become stripped, the screw no longer holds the motor in place to the structural member (e.g., a boom arm of the aerial vehicle). Further, because the power or control signal is provided to the motor via the screw, the threads being stripped also prevents the motor from receiving the power or control signal. In this and other examples, conductive properties of a coupling member can be used to passively sense and mitigate mechanical breaks in the system.

In one aspect, an aerial vehicle is provided. The aerial vehicle includes a power circuit. The aerial vehicle includes an operational member configured to move responsive to receiving a power or control signal from the power circuit. The aerial vehicle includes a structural member configured to stabilize one or more operational members of the aerial vehicle. The aerial vehicle includes a coupling member configured to secure the operational member to the structural member at a contact point. The coupling member includes a conductive material incorporated into the power circuit between a first terminal and a second terminal. A mechanical break of the coupling member results in: (i) the operational member becoming unsecured from the structural member at the contact point, and (ii) an electrical disconnect between the first terminal and the second terminal. The electrical disconnect stops the power or control signal and thereby stops the operational member from moving.

In another aspect, a method is provided. The method includes causing an operational member of a system to move. The method includes driving a power or control signal through a conductive coupling member. The conductive coupling member is connected between a first terminal and a second terminal in a power circuit, and the coupling member secures the operational member to a structural member of the system. The method includes detecting an electrical disconnect between the first terminal and a second terminal. The method includes determining a mechanical break associated with the coupling member based on the electrical disconnect between the first terminal and the second terminal. The method includes causing the operational member of the system to stop moving based on determining the mechanical break associated with the coupling member.

In another aspect, a system is provided. The system includes a power circuit. The system includes a plurality of operational members configured to move responsive to receiving respective power or control signals from the power circuit. The system includes one or more structural members configured to stabilize the plurality of operational members. The system includes a plurality of coupling members configured to secure the plurality of operational members to the one or more structural members at a plurality of contact points. Each respective coupling member of the plurality of coupling members comprises a conductive material incorporated into the power circuit between a respective first terminal and a respective second terminal. A mechanical break of a respective coupling member results in: (i) a respective operational member corresponding to the respective coupling member becoming unsecured from a corresponding structural member at a corresponding contact point, and (ii) an electrical disconnect between the respective first terminal and the respective second terminal. The electrical disconnect stops a respective power or control signal from reaching the respective operational member and thereby stops the respective operational member from moving. The present embodiments further provide a system. The system includes means for causing an operational member of a system to move. The system includes means for driving a power or control signal through a conductive coupling member. The conductive coupling member is connected between a first terminal and a second terminal in a power circuit, and the coupling member secures the operational member to a structural member of the system. The system includes means for detecting an electrical disconnect between the first terminal and a second terminal. The system includes means for determining a mechanical break associated with the coupling member based on the electrical disconnect between the first terminal and the second terminal. The system includes means for causing the operational member of the system to stop moving based on determining the mechanical break associated with the coupling member.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 1 is a simplified block diagram of a system, according to an example.

DETAILED DESCRIPTION

Figure 2A:
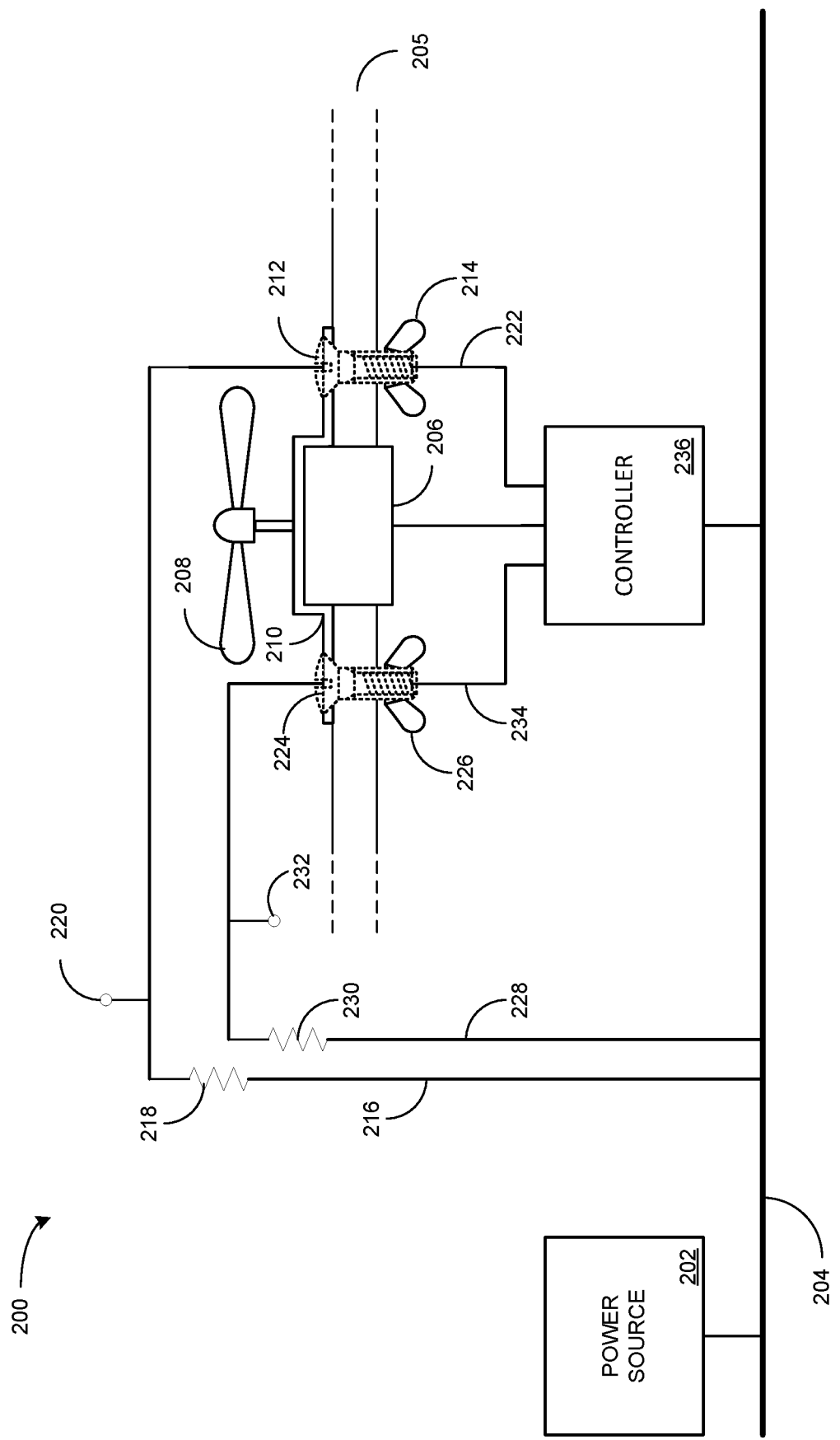
FIG. 2A is a simplified illustration of a power circuit in a first state, according to an example.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

The present embodiments advantageously provide an aerial vehicle, method, and system for changing the state of operational members in a system. The present embodiments are directed to an operational member secured to a structural member using a coupling member. As used herein, an "operational member" generally relates to a member that performs an active function during operation of a system, such as a member that generates movement. As a non-limiting example, in the context of an aerial vehicle, a motor, servo, piston, and an actuator each may be considered operational members. In some examples, an operational member may continue to function even when it is disadvantageous to do so. For example, in the context of an aerial vehicle, if a motor and/or corresponding propeller becomes unsecured, it may exert unexpected force vectors on the aerial vehicle and strain other components of the system in order to correct for these unexpected forces. Further, such unexpected operation may lead to erroneous determinations about the environment of the system. For example, the unsecured motor and/or propeller may cause an aerial vehicle to list, tilt, and/or rotate in a manner similar to that caused when the aerial vehicle experiences turbulence. This may result in the aerial vehicle grounding unnecessarily, or operating under an erroneous determination about the environment. Accordingly, within these contexts, it is desirable for the operational member to stop movement. In this manner, the aforementioned motor/propeller might not produce any lift, but other propellers in the aerial vehicle can predictably operate the aerial vehicle to account for this lack of lift typically generated from the motor.

To facilitate such operations, the coupling member can be conductive, and be integrated into a power circuit used for providing a power or control signal to the operational member. As used herein, the term "power or control signal" refers to a signal that supplies power to an operational member and thereby allows it to produce movement (e.g., a connection between a power input terminal of an operational member and a power bus can be considered to a power signal) or a signal that carries control information to an operational member and thereby controls an aspect of its movement (e.g., a modulated signal received at a control input terminal of an operational member can be considered a control signal). For example, the coupling member can provide one or more phases of a multi-phase (e.g., three-phase) signal sent to a motor used to drive a propeller, can correspond to an input signal of the motor (e.g., a pulse-width modulation (PWM) signal used to control a speed of the motor), or may connect the motor directly to a power bus. In further examples, a Controller Area Network (CAN) signal can similarly control movement of an operational member via the coupling member. These components are configured such that, if the coupling member fails (e.g., experiences a mechanical break), the power or control signal is disrupted, and a status of the operational member changes. In this manner, if the coupling member experiences a mechanical break, the motor automatically stops moving.

Within examples, the coupling member may be a screw composed of a conductive material. The screw may secure the operational member to a structural member (e.g., a boom arm of an aerial vehicle) at a contact point. The contact point may simultaneously couple the coupling member to the structural member and serve as an electrical connection point for two terminals in the power circuit. For example, the two terminals can be held together using the screw at the contact point, and the screw having stripped threads or another mechanical break (e.g., a shearing break of the screw, such as a screw shaft breaking apart, or a "pull through" of the screw, such as the screw pulling through a structural member) may cause the two terminals to disconnect. Accordingly, as a result of the mechanical break of the screw, the operational member stops moving. In other examples, the coupling member can be a rivet or another component configured for coupling an operational member to a structural member.

Within examples, coupling members are used to provide status updates to a central controller of the system. For example, a computing device may receive an output from the power circuit and detect an electrical disconnect between the two terminals. The computing device may then control the corresponding operational member to stop moving, and change operation of other operational members to make up for the operational member not moving. Accordingly, systems and methods are provided at allow for changing operation of a second operational member based on detecting a mechanical failure of a coupling member associated with a first operational member.

In further examples, conductive features may be incorporated into structural members of a system and detected characteristics of the conductive features can be used to determine a status of the structure. For example, an impact to a structural member may alter the conductivity (e.g., by increasing a resistance level) of the conductive features. A computing device can detect this change in conductivity to determine a change in a state of the structural member. The computing device can control operational members of the system based on this determination, or schedule maintenance of the system. Thus, conductive aspects of a system can be used to detect mechanical breaks, failure states, or the like, and a computing device can control the system accordingly.

II. ILLUSTRATIVE UNMANNED VEHICLES

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

An example UAV includes a wing, booms, and a fuselage. The wings may be stationary and may generate lift based on the wing shape and the UAV's forward airspeed. For instance, the wings may have an airfoil-shaped cross section to produce an aerodynamic force on the UAV. In some embodiments, a wing may carry horizontal propulsion units, and the booms may carry vertical propulsion units. In operation, power for the propulsion units may be provided from a battery compartment of the fuselage. In some embodiments, the fuselage also includes an avionics compartment, an additional battery compartment and/or a delivery unit, e.g., a winch system) for handling the payload. In some embodiments, the fuselage is modular, and two or more compartments (e.g., the battery compartment, the avionics compartment, and/or other payload and delivery compartments) are detachable from each other and securable to each other (e.g., mechanically, magnetically, or otherwise) to contiguously form at least a portion of the fuselage.

In some embodiments, the booms terminate in rudders for improved yaw control of the UAV. Further, the wings may include one or more ailerons for improved roll control of the UAV.

In the example configuration, the UAV includes a structural frame. The structural frame may be referred to as a "structural H-frame" or an "H-frame" of the UAV. The H-frame may include, within the wings, a wing spar and, within the booms, boom carriers. In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units, and the boom carriers may include pre-drilled holes for vertical propulsion units.

In some embodiments, the fuselage may be removably attached to the H-frame (e.g., attached to the wing spar by clamps, configured with grooves, protrusions or other features to mate with corresponding H-frame features, etc.). In other embodiments, the fuselage similarly may be removably attached to the wings. The removable attachment of the fuselage may improve quality and or modularity of the UAV. For example, electrical/mechanical components and/or subsystems of the fuselage may be tested separately from, and before being attached to, the H-frame. Similarly, printed circuit boards (PCBs) may be tested separately from, and before being attached to, the boom carriers, therefore eliminating defective parts/subassemblies prior to completing the UAV. For example, components of the fuselage (e.g., avionics, battery unit, delivery units, an additional battery compartment, etc.) may be electrically tested before the fuselage is mounted to the H-frame. Furthermore, the motors and the electronics of the PCBs may also be electrically tested before the final assembly. Generally, the identification of the defective parts and subassemblies early in the assembly process lowers the overall cost and lead time of the UAV. Furthermore, different types/models of the fuselage may be attached to the H-frame, therefore improving the modularity of the design. Such modularity allows these various parts of the UAV to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body molded around the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from the fuselage may be routed to PCBs through cables running through the fuselage, the wings, and the booms. In an example embodiment, the UAV has four PCBs, but other numbers of PCBs are also possible. For example, the UAV may include two PCBs, one per the boom. The PCBs carry electronic components including, for example, power converters, controllers, memory, passive components, etc. In operation, the propulsion units of the UAV are electrically connected to the PCBs.

Many variations on the example UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although the example UAV includes two wings, two booms, two horizontal propulsion units, and six vertical propulsion units per boom, it should be appreciated that other variants of the example UAV may be implemented with more or less of these components. For example, the UAV may include four wings, four booms, and more or less propulsion units (horizontal or vertical).

Many variations on the illustrated fixed-wing UAV are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

An example UAV may include various types of sensors, and may include a computing system configured to provide the functionality described herein. In the example embodiment, the sensors of the UAV include an inertial measurement unit (IMU), ultrasonic sensor(s), and a GPS, among other possible sensors and sensing systems. In examples, the UAV can include a laser rangefinder (not depicted) as well. Other configurations of the UAV are possible.

In the example embodiment, the UAV also includes one or more processors. A processor may be a general-purpose processor or a special purpose processor (e.g., digital signal processors, application specific integrated circuits, etc.). The one or more processors can be configured to execute computer-readable program instructions that are stored in the data storage and are executable to provide the functionality of a UAV described herein.

The data storage may include or take the form of one or more computer-readable storage media that can be read or accessed by at least one processor. The one or more computer-readable storage media can include volatile and/or non-volatile storage components, such as optical, magnetic, organic or other memory or disc storage, which can be integrated in whole or in part with at least one of the one or more processors. In some embodiments, the data storage can be implemented using a single physical device (e.g., one optical, magnetic, organic or other memory or disc storage unit), while in other embodiments, the data storage can be implemented using two or more physical devices.

As noted, the data storage can include computer-readable program instructions and perhaps additional data, such as diagnostic data of the UAV. As such, the data storage may include program instructions to perform or facilitate some or all of the UAV functionality described herein. For instance, in the example embodiment, program instructions include a navigation module and a tether control module.

A. Sensors

In an illustrative embodiment, an IMU may include both an accelerometer and a gyroscope, which may be used together to determine an orientation of the UAV. In particular, the accelerometer can measure the orientation of the vehicle with respect to earth, while the gyroscope measures the rate of rotation around an axis. IMUs are commercially available in low-cost, low-power packages. For instance, an IMU may take the form of or include a miniaturized MicroElectroMechanical System (MEMS) or a NanoElectroMechanical System (NEMS). Other types of IMUs may also be utilized.

An IMU may include other sensors, in addition to accelerometers and gyroscopes, which may help to better determine position and/or help to increase autonomy of the UAV. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

The UAV may also include a pressure sensor or barometer, which can be used to determine the altitude of the UAV. Alternatively, other sensors, such as sonic altimeters or radar altimeters, can be used to provide an indication of altitude, which may help to improve the accuracy of and/or prevent drift of an IMU.

In a further aspect, the UAV may include one or more sensors that allow the UAV to sense objects in the environment. For instance, in the example embodiment, UAV includes ultrasonic sensor(s). Ultrasonic sensor(s) can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, the UAV may also include one or more imaging system(s). For example, one or more still and/or video cameras may be utilized by UAV to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

The UAV may also include a GPS receiver. The GPS receiver may be configured to provide data that is typical of well-known GPS systems, such as the GPS coordinates of the UAV. Such GPS data may be utilized by the UAV for various functions. As such, the UAV may use its GPS receiver to help navigate to the caller's location, as indicated, at least in part, by the GPS coordinates provided by their mobile device. Other examples are also possible.

B. Navigation and Location Determination

The navigation module may provide functionality that allows the UAV to, e.g., move about its environment and reach a desired location. To do so, the navigation module may control the altitude and/or direction of flight by controlling the mechanical features of the UAV that affect flight (e.g., its rudder(s), elevator(s), aileron(s), and/or the speed of its propeller(s)).

In order to navigate the UAV to a target location, the navigation module may implement various navigation techniques, such as map-based navigation and localization-based navigation, for instance. With map-based navigation, the UAV may be provided with a map of its environment, which may then be used to navigate to a particular location on the map. With localization-based navigation, the UAV may be capable of navigating in an unknown environment using localization. Localization-based navigation may involve the UAV building its own map of its environment and calculating its position within the map and/or the position of objects in the environment. For example, as a UAV moves throughout its environment, the UAV may continuously use localization to update its map of the environment. This continuous mapping process may be referred to as simultaneous localization and mapping (SLAM). Other navigation techniques may also be utilized.

In some embodiments, the navigation module may navigate using a technique that relies on waypoints. In particular, waypoints are sets of coordinates that identify points in physical space. For instance, an air-navigation waypoint may be defined by a certain latitude, longitude, and altitude. Accordingly, the navigation module may cause UAV to move from waypoint to waypoint, in order to ultimately travel to a final destination (e.g., a final waypoint in a sequence of waypoints).

In a further aspect, the navigation module and/or other components and systems of the UAV may be configured for "localization" to more precisely navigate to the scene of a target location. More specifically, it may be desirable in certain situations for a UAV to be within a threshold distance of the target location where a payload is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV may navigate to the general area of a target destination where a payload is being delivered using waypoints and/or map-based navigation. The UAV may then switch to a mode in which it utilizes a localization process to locate and travel to a more specific location. For instance, if the UAV is to deliver a payload to a user's home, the UAV may need to be substantially close to the target location in order to avoid delivery of the payload to undesired areas (e.g., onto a roof, into a pool, onto a neighbor's property, etc.). However, a GPS signal may only get the UAV so far (e.g., within a block of the user's home). A more precise location-determination technique may then be used to find the specific target location.

Various types of location-determination techniques may be used to accomplish localization of the target delivery location once the UAV has navigated to the general area of the target delivery location. For instance, the UAV may be equipped with one or more sensory systems, such as, for example, ultrasonic sensors, infrared sensors (not shown), and/or other sensors, which may provide input that the navigation module utilizes to navigate autonomously or semi-autonomously to the specific target location.

As another example, once the UAV reaches the general area of the target delivery location (or of a moving subject such as a person or their mobile device), the UAV may switch to a "fly-by-wire" mode where it is controlled, at least in part, by a remote operator, who can navigate the UAV to the specific target location. To this end, sensory data from the UAV may be sent to the remote operator to assist them in navigating the UAV to the specific location.

As yet another example, the UAV may include a module that is able to signal to a passer-by for assistance in either reaching the specific target delivery location; for example, the UAV may display a visual message requesting such assistance in a graphic display, play an audio message or tone through speakers to indicate the need for such assistance, among other possibilities. Such a visual or audio message might indicate that assistance is needed in delivering the UAV to a particular person or a particular location, and might provide information to assist the passer-by in delivering the UAV to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV arrives at the general area of a target delivery location, the UAV may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV may be configured to navigate by "sourcing" such directional signals—in other words, by determining where the signal is strongest and navigating accordingly. As another example, a mobile device can emit a frequency, either in the human range or outside the human range, and the UAV can listen for that frequency and navigate accordingly. As a related example, if the UAV is listening for spoken commands, then the UAV could utilize spoken statements, such as "I'm over here!" to source the specific location of the person requesting delivery of a payload.

In an alternative arrangement, a navigation module may be implemented at a remote computing device, which communicates wirelessly with the UAV. The remote computing device may receive data indicating the operational state of the UAV, sensor data from the UAV that allows it to assess the environmental conditions being experienced by the UAV, and/or location information for the UAV. Provided with such information, the remote computing device may determine altitudinal and/or directional adjustments that should be made by the UAV and/or may determine how the UAV should adjust its mechanical features (e.g., its rudder(s), elevator(s), aileron(s), and/or the speed of its propeller(s) in order to effectuate such movements. The remote computing system may then communicate such adjustments to the UAV so it can move in the determined manner.

C. Communication Systems

In a further aspect, the UAV includes one or more communication systems. The communications systems may include one or more wireless interfaces and/or one or more wireline interfaces, which allow the UAV to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV may include communication systems that allow for both short-range communication and long-range communication. For example, the UAV may be configured for short-range communications using Bluetooth and for long-range communications under a CDMA protocol. In such an embodiment, the UAV may be configured to function as a "hot spot;" or in other words, as a gateway or proxy between a remote support device and one or more data networks, such as a cellular network and/or the Internet. Configured as such, the UAV may facilitate data communications that the remote support device would otherwise be unable to perform by itself.

For example, the UAV may provide a WiFi connection to a remote device, and serve as a proxy or gateway to a cellular service provider's data network, which the UAV might connect to under an LTE or a 3G protocol, for instance. The UAV could also serve as a proxy or gateway to a high-altitude balloon network, a satellite network, or a combination of these networks, among others, which a remote device might not be able to otherwise access.

D. Power Systems

In a further aspect, the UAV may include a power system(s). The power system may include one or more batteries for providing power to the UAV. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV may employ various systems and configurations in order to transport and deliver a payload. In some implementations, the payload of a given UAV may include or take the form of a "package" designed to transport various goods to a target delivery location. For example, the UAV can include a compartment, in which an item or items may be transported. Such a package may one or more food items, purchased goods, medical items, or any other object(s) having a size and weight suitable to be transported between two locations by the UAV. In other embodiments, a payload may simply be the one or more items that are being delivered (e.g., without any package housing the items).

In some embodiments, the payload may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system controlled by the tether control module in order to lower the payload to the ground while the UAV hovers above. The winch system may include a tether, and the tether may be coupled to the payload by a payload coupling apparatus. The tether may be wound on a spool that is coupled to a motor of the UAV. The motor may take the form of a DC motor (e.g., a servo motor) that can be actively controlled by a speed controller. The tether control module can control the speed controller to cause the motor to rotate the spool, thereby unwinding or retracting the tether and lowering or raising the payload coupling apparatus. In practice, the speed controller may output a desired operating rate (e.g., a desired RPM) for the spool, which may correspond to the speed at which the tether and payload should be lowered towards the ground. The motor may then rotate the spool so that it maintains the desired operating rate.

In order to control the motor via the speed controller, the tether control module may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor causes rotation of the spool, a rotary encoder may be used to measure this rotation. In doing so, the rotary encoder may be used to convert a rotary position to an analog or digital electronic signal used by the tether control module to determine the amount of rotation of the spool from a fixed reference angle and/or to an analog or digital electronic signal that is representative of a new rotary position, among other options. Other examples are also possible.

Based on the data from the speed sensor, the tether control module may determine a rotational speed of the motor and/or the spool and responsively control the motor (e.g., by increasing or decreasing an electrical current supplied to the motor) to cause the rotational speed of the motor to match a desired speed. When adjusting the motor current, the magnitude of the current adjustment may be based on a proportional-integral-derivative (PID) calculation using the determined and desired speeds of the motor. For instance, the magnitude of the current adjustment may be based on a present difference, a past difference (based on accumulated error over time), and a future difference (based on current rates of change) between the determined and desired speeds of the spool.

In some embodiments, the tether control module may vary the rate at which the tether and payload are lowered to the ground. For example, the speed controller may change the desired operating rate according to a variable deployment-rate profile and/or in response to other factors in order to change the rate at which the payload descends toward the ground. To do so, the tether control module may adjust an amount of braking or an amount of friction that is applied to the tether. For example, to vary the tether deployment rate, the UAV may include friction pads that can apply a variable amount of pressure to the tether. As another example, the UAV can include a motorized braking system that varies the rate at which the spool lets out the tether. Such a braking system may take the form of an electromechanical system in which the motor operates to slow the rate at which the spool lets out the tether. Further, the motor may vary the amount by which it adjusts the speed (e.g., the RPM) of the spool, and thus may vary the deployment rate of the tether. Other examples are also possible.

In some embodiments, the tether control module may be configured to limit the motor current supplied to the motor to a maximum value. With such a limit placed on the motor current, there may be situations where the motor cannot operate at the desired operate specified by the speed controller. For instance, as discussed in more detail below, there may be situations where the speed controller specifies a desired operating rate at which the motor should retract the tether toward the UAV, but the motor current may be limited such that a large enough downward force on the tether would counteract the retracting force of the motor and cause the tether to unwind instead. And as further discussed below, a limit on the motor current may be imposed and/or altered depending on an operational state of the UAV.

In some embodiments, the tether control module may be configured to determine a status of the tether and/or the payload based on the amount of current supplied to the motor. For instance, if a downward force is applied to the tether (e.g., if the payload is attached to the tether or if the tether gets snagged on an object when retracting toward the UAV), the tether control module may need to increase the motor current in order to cause the determined rotational speed of the motor and/or spool to match the desired speed. Similarly, when the downward force is removed from the tether (e.g., upon delivery of the payload or removal of a tether snag), the tether control module may need to decrease the motor current in order to cause the determined rotational speed of the motor and/or spool to match the desired speed. As such, the tether control module may be configured to monitor the current supplied to the motor. For instance, the tether control module could determine the motor current based on sensor data received from a current sensor of the motor or a current sensor of the power system. In any case, based on the current supplied to the motor, determine if the payload is attached to the tether, if someone or something is pulling on the tether, and/or if the payload coupling apparatus is pressing against the UAV after retracting the tether. Other examples are possible as well.

During delivery of the payload, the payload coupling apparatus can be configured to secure the payload while being lowered from the UAV by the tether, and can be further configured to release the payload upon reaching ground level. The payload coupling apparatus can then be retracted to the UAV by reeling in the tether using the motor.

In some implementations, the payload may be passively released once it is lowered to the ground. For example, a passive release mechanism may include one or more swing arms adapted to retract into and extend from a housing. An extended swing arm may form a hook on which the payload may be attached. Upon lowering the release mechanism and the payload to the ground via a tether, a gravitational force as well as a downward inertial force on the release mechanism may cause the payload to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload no longer forces the swing arm to extend from the housing. Retracting the swing arm into the housing may reduce the likelihood of the release mechanism snagging the payload or other nearby objects when raising the release mechanism toward the UAV upon delivery of the payload.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV could include an air-bag drop system or a parachute drop system. Alternatively, a UAV carrying a payload could simply land on the ground at a delivery location. Other examples are also possible.

IV. ILLUSTRATIVE UAV DEPLOYMENT SYSTEMS

The UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area.

In the example UAV system, an access system may allow for interaction with, control of, and/or utilization of a network of UAVs. In some embodiments, an access system may be a computing system that allows for human-controlled dispatch of UAVs. As such, the control system may include or otherwise provide a user interface through which a user can access and/or control the UAVs.

In some embodiments, dispatch of the UAVs may additionally or alternatively be accomplished via one or more automated processes. For instance, the access system may dispatch one of the UAVs to transport a payload to a target location, and the UAV may autonomously navigate to the target location by utilizing various on-board sensors, such as a GPS receiver and/or other various navigational sensors.

Further, the access system may provide for remote operation of a UAV. For instance, the access system may allow an operator to control the flight of a UAV via its user interface. As a specific example, an operator may use the access system to dispatch a UAV to a target location. The UAV may then autonomously navigate to the general area of the target location. At this point, the operator may use the access system to take control of the UAV and navigate the UAV to the target location (e.g., to a particular person to whom a payload is being transported). Other examples of remote operation of a UAV are also possible.

In an illustrative embodiment, the UAVs may take various forms. For example, each of the UAVs may be a UAV such as those illustrated in FIGS. 1A-1E. However, UAV system may also utilize other types of UAVs without departing from the scope of the invention. In some implementations, all of the UAVs may be of the same or a similar configuration. However, in other implementations, the UAVs may include a number of different types of UAVs. For instance, the UAVs may include a number of types of UAVs, with each type of UAV being configured for a different type or types of payload delivery capabilities.

The UAV system may further include a remote device, which may take various forms. Generally, the remote device may be any device through which a direct or indirect request to dispatch a UAV can be made. (Note that an indirect request may involve any communication that may be responded to by dispatching a UAV, such as requesting a package delivery). In an example embodiment, the remote device may be a mobile phone, tablet computer, laptop computer, personal computer, or any network-connected computing device. Further, in some instances, the remote device may not be a computing device. As an example, a standard telephone, which allows for communication via plain old telephone service (POTS), may serve as the remote device. Other types of remote devices are also possible.

Further, the remote device may be configured to communicate with access system via one or more types of communication network(s). For example, the remote device may communicate with the access system (or a human operator of the access system) by communicating over a POTS network, a cellular network, and/or a data network such as the Internet. Other types of networks may also be utilized.

In some embodiments, the remote device may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system may receive location information (e.g., GPS coordinates, etc.) from the user's mobile phone, or any other device on the user's person, such that a UAV can navigate to the user's location (as indicated by their mobile phone).

In an illustrative arrangement, the central dispatch system may be a server or group of servers, which is configured to receive dispatch messages requests and/or dispatch instructions from the access system. Such dispatch messages may request or instruct the central dispatch system to coordinate the deployment of UAVs to various target locations. The central dispatch system may be further configured to route such requests or instructions to one or more local dispatch systems. To provide such functionality, the central dispatch system may communicate with the access system via a data network, such as the Internet or a private network that is established for communications between access systems and automated dispatch systems.

In the illustrated configuration, the central dispatch system may be configured to coordinate the dispatch of UAVs from a number of different local dispatch systems. As such, the central dispatch system may keep track of which UAVs are located at which local dispatch systems, which UAVs are currently available for deployment, and/or which services or operations each of the UAVs is configured for (in the event that a UAV fleet includes multiple types of UAVs configured for different services and/or operations). Additionally or alternatively, each local dispatch system may be configured to track which of its associated UAVs are currently available for deployment and/or are currently in the midst of item transport.

In some cases, when the central dispatch system receives a request for UAV-related service (e.g., transport of an item) from the access system, the central dispatch system may select a specific UAV to dispatch. The central dispatch system may accordingly instruct the local dispatch system that is associated with the selected UAV to dispatch the selected UAV. The local dispatch system may then operate its associated deployment system to launch the selected UAV. In other cases, the central dispatch system may forward a request for a UAV-related service to a local dispatch system that is near the location where the support is requested and leave the selection of a particular UAV to the local dispatch system.

In an example configuration, the local dispatch system may be implemented as a computing system at the same location as the deployment system(s) that it controls. For example, the local dispatch system may be implemented by a computing system installed at a building, such as a warehouse, where the deployment system(s) and UAV(s) that are associated with the particular local dispatch system are also located. In other embodiments, the local dispatch system may be implemented at a location that is remote to its associated deployment system(s) and UAV(s).

Numerous variations on and alternatives to the illustrated configuration of the UAV system are possible. For example, in some embodiments, a user of the remote device could request delivery of a package directly from the central dispatch system. To do so, an application may be implemented on the remote device that allows the user to provide information regarding a requested delivery, and generate and send a data message to request that the UAV system provide the delivery. In such an embodiment, the central dispatch system may include automated functionality to handle requests that are generated by such an application, evaluate such requests, and, if appropriate, coordinate with an appropriate local dispatch system to deploy a UAV.

Further, some or all of the functionality that is attributed herein to the central dispatch system, the local dispatch system(s), the access system, and/or the deployment system(s) may be combined in a single system, implemented in a more complex system, and/or redistributed among the central dispatch system, the local dispatch system(s), the access system, and/or the deployment system(s) in various ways.

Yet further, while each local dispatch system is shown as having two associated deployment systems, a given local dispatch system may alternatively have more or fewer associated deployment systems. Similarly, while the central dispatch system is shown as being in communication with two local dispatch systems, the central dispatch system may alternatively be in communication with more or fewer local dispatch systems.

In a further aspect, the deployment systems may take various forms. In general, the deployment systems may take the form of or include systems for physically launching one or more of the UAVs. Such launch systems may include features that provide for an automated UAV launch and/or features that allow for a human-assisted UAV launch. Further, the deployment systems may each be configured to launch one particular UAV, or to launch multiple UAVs.

The deployment systems may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems and their corresponding UAVs (and possibly associated local dispatch systems) may be strategically distributed throughout an area such as a city. For example, the deployment systems may be strategically distributed such that each deployment system is proximate to one or more payload pickup locations (e.g., near a restaurant, store, or warehouse). However, the deployment systems (and possibly the local dispatch systems) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system may include or have access to a user-account database. The user-account database may include data for a number of user accounts, and which are each associated with one or more person. For a given user account, the user-account database may include data related to or useful in providing UAV-related services. Typically, the user data associated with each user account is optionally provided by an associated user and/or is collected with the associated user's permission.

Further, in some embodiments, a person may be required to register for a user account with the UAV system, if they wish to be provided with UAV-related services by the UAVs from UAV system. As such, the user-account database may include authorization information for a given user account (e.g., a user name and password), and/or other information that may be used to authorize access to a user account.

In some embodiments, a person may associate one or more of their devices with their user account, such that they can access the services of UAV system. For example, when a person uses an associated mobile phone, e.g., to place a call to an operator of the access system or send a message requesting a UAV-related service to a dispatch system, the phone may be identified via a unique device identification number, and the call or message may then be attributed to the associated user account. Other examples are also possible.

V. EXAMPLE SYSTEMS AND APPARATUSES FOR CHANGING STATES OF OPERATIONAL MEMBERS

FIG. 1 is a simplified block diagram of a system, according to an example. In particular, FIG. 1 shows a system 100 having a computing device 102 having processor(s) 104, memory 106, and instructions 108. The computing device 102 can serve as a central controller for the system 100. Within certain examples, system 100 may correspond to a system of UAV described above. For example, processor(s) 104 may correspond to processor(s) described above.

In the illustrated embodiment, UAV also includes one or more processors. A processor may be a general-purpose processor or a special purpose processor (e.g., digital signal processors, application specific integrated circuits, etc.). The one or more processors can be configured to execute computer-readable program instructions that are stored in the data storage and are executable to provide the functionality of a UAV described herein. System 100 further includes a power source 110 connected to a power circuit 112, which supplies one or more power or control signals to a plurality of operational members including operational member 114 and operational member 116.

Memory 106 may include or take the form of one or more computer-readable storage media that can be read or accessed by at least one processor of processor(s) 104. The one or more computer-readable storage media can include volatile and/or non-volatile storage components, such as optical, magnetic, organic or other memory or disc storage, which can be integrated in whole or in part with at least one of processor(s) 104. In some embodiments, the memory 106 can be implemented using a single physical device (e.g., one optical, magnetic, organic or other memory or disc storage unit), while in other embodiments, the data storage can be implemented using two or more physical devices.

Memory 106 can include instructions, such as computer-readable program instructions, and perhaps additional data, such as diagnostic data of system 100 (e.g., of the UAV). As such, memory 106 may include instructions 108 to perform or facilitate some or all of the functionality described herein with respect to system 100. For instance, in the illustrated embodiment, instructions 108 correspond to operations involving power circuit 112 and the plurality of operational members.

Power circuit 112 includes a plurality of conductive coupling members that correspond to the plurality of operational members. As shown in FIG. 1, conductive coupling member 118 corresponds to operational member 114 and conductive coupling member 120 corresponds to operational member 116. Power circuit 112 receives power from power source 110. For example, power source 110 may be a battery of system 100. Power circuit 112 may include a plurality of current paths that draw power from power source 110 and that include the conductive coupling members. A mechanical break of one of the coupling members may prevent the power or control signal from reaching a corresponding operational member, and thereby cause the operational member to stop moving. In some examples, stopping the power or control signal can be based on the computing device 102 or the operational member sensing an electrical disconnect resulting from a mechanical break of a conductive coupling member. In other examples, this may occur because the power or control signal stops being provided to the operational member. For example, if each current path of the power circuit is connected to a power bus of power source 110, then the mechanical break will stop the operational member from receiving power, and thus movement of the operational member will stop due to a lack of power being supplied. Other possible ways of changing the state of an operational member based on conductive coupling members are possible, as described below.

Within further examples, system 100 may include one or more structural members. The conductive coupling members may secure each operational member to the one or more structural members. As described further below, the one or more structural members may also include conductive features incorporated therein, and allow for robust sensing of the status of the structural members as well. In such scenarios, power circuit 112, or more generally system 100, may also include a plurality of conductive features that are incorporated into the one or more structural members. Example implementations of these systems are described below.

FIG. 2A is a simplified illustration of a power circuit in a first state, according to an example. In particular, FIG. 2A shows power circuit 200 when coupling members are not experiencing a mechanical break. Power circuit 200 includes a power source 202, a power bus 204, a first current path 216 and a second current path 228. FIG. 2A also shows a structural member 205, and a motor 206 that drives a propeller 208. Motor 206 can be considered an operational member because motor 206 generates movement of propeller 208 and facilitates operation of an aerial vehicle. For purposes of the present example, the structural member 205 can be understood to be a boom arm, a fuselage, or another structural aspect of the aerial vehicle. Motor 206 is secured to structural member 205 using a securing plate 210, a first screw 212 and corresponding nut 214 and a second screw 224 and corresponding nut 226. First screw 212 and second screw 224 can be considered coupling members of the depicted system. Within examples, securing plate 210, nut 214, and 226 can also be considered coupling members. In still further examples, securing plate 210, first screw 212 and corresponding nut 214, and second screw 224 and corresponding nut 226 may collectively be considered a coupling member of the system. Though not depicted, an insulating feature may be included to shield elements of first current path 216 and second current path 228 from other possibly conductive features in the system or surrounding environment. For example, an insulating material could be used to cover first screw 212 and second screw 224 to prevent moisture from the outside environment (e.g., rain) from creating alternate current paths. Similarly, an insulating material could be used between first screw 212, second screw 224, and securing plate 210 and structural member 205 to prevent current paths flowing through other components of the system.

First screw 212 and second screw 224 are conductive and each is part of power circuit 200. In particular, first screw 212 is part of first current path 216 and second screw 224 is part of second current path 228. Each current path supplies a power or control signal to a controller 236 of motor 206. As shown in FIG. 2A, nut 214 is connected to a first input line 222, which provides the power or control signal to controller 236 via first screw 212. Similarly, nut 226 is connected to a second input line 234, which provides the power or control signal to controller 236 via second screw 224. Each current path can connect controller 236 to power bus 204 (as shown in FIG. 2A), supply a control signal that relates to how much power to provide to motor 206 (e.g., a PWM signal), or correspond to a phase of a multi-phase power or control signal. Other types of power or control signals are possible. In general, a power or control signal may refer to a signal that dictates an amount of power consumed by an operational. In some contexts the power or control signal can be binary: either the operational member receives power or it does not. In other contexts the power or control signal allows for a range of power levels to be consumed by the operational member (e.g., when a PWM or CAN signal is used).

Power circuit 200 further includes a first resistor 218 in first current path 216 and a second resistor 230 in second current path. Further, power circuit 200 includes a first node 220 of first current path 216 and a second node 232 of second current path 228. In the first state of power circuit 200, current flows through both current paths and the conductive coupling members to controller 236. Controller 236 may have an internal resistance and thus first node 220 and second node 232 may have voltage levels based on a resistance of first resistor 218, second resistor 230, and the internal resistance of controller 236. Accordingly, a computing device can determine the state of power circuit 200 by sampling the voltage level at first node 220 and at second node 232. As depicted in FIG. 2A, a voltage level that is less than that of power bus 204 indicates that a coupling member has not experienced a mechanical break.

Figure 2B:
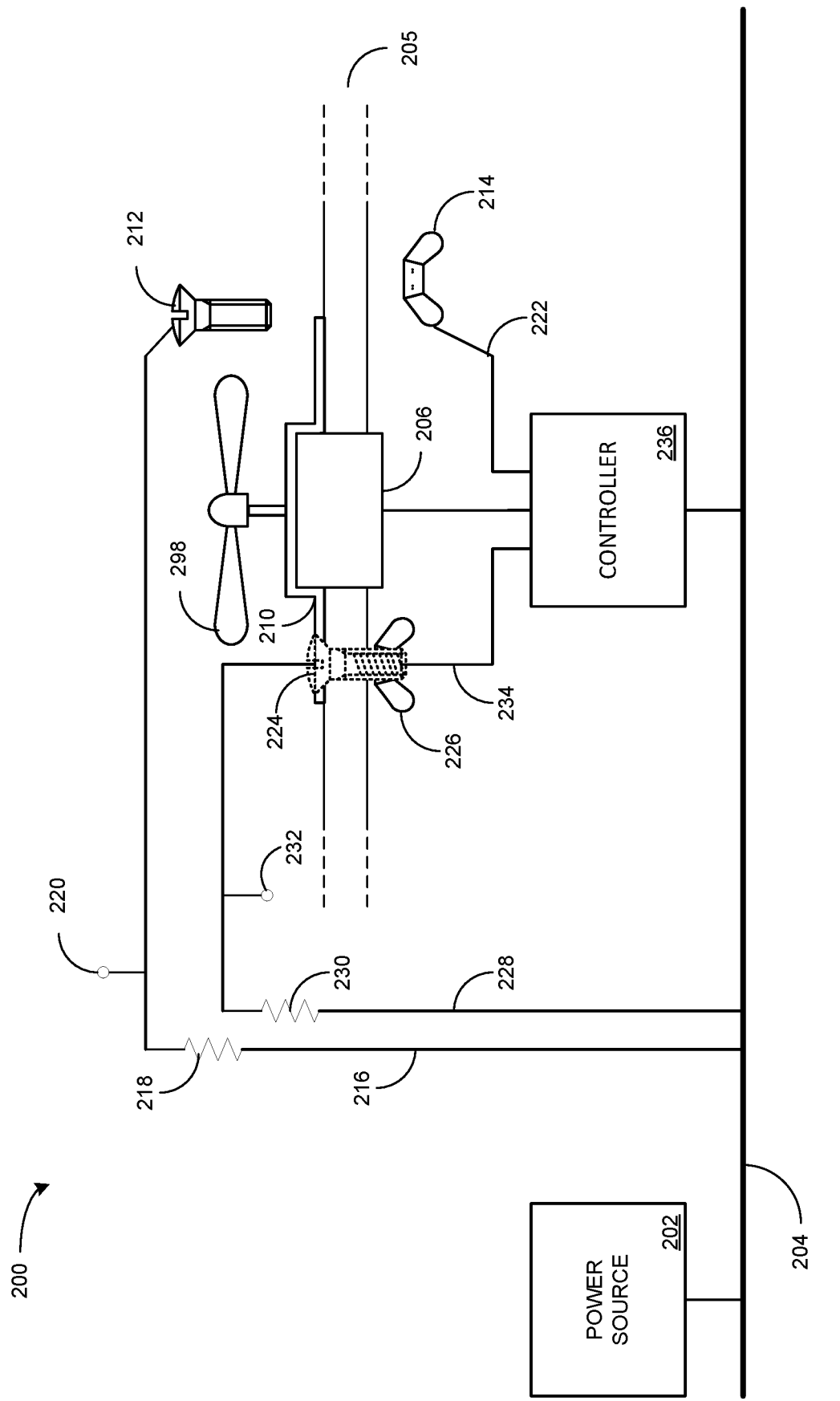
FIG. 2B is a simplified illustration of a power circuit in a second state, according to an example.

Though two coupling members—first screw 212 and second screw 224—are depicted in FIG. 2A, more or fewer coupling members could be used. Further, though power circuit 200 is uses power bus 204 to provide the power or control signal to controller 236, other examples can involve the power or control signal originating elsewhere, such as directly from a computing device (e.g., computing device 402) or another component of a system. Power circuit 200 may be configured in other ways and still provide similar functionality as that shown in FIG. 2A FIG. 2B is a simplified illustration of a power circuit in a second state, according to an example. In particular, FIG. 2B shows power circuit 200 in a second state. The second state of FIG. 2B can be understood as a state of power circuit 200 that occurs after the first state depicted in FIG. 2A. In FIG. 2B, first screw 212 is not connected to nut 214 because the threads of first screw 212 have stripped. This causes motor 206 to become unsecured from structural member 205. Further, because screw 212 has experienced a mechanical break, a first terminal associated with first node 220 and a second terminal associated with first input line 222 become electrically disconnected.

Controller 236 may determine the electrical disconnect based on receiving zero power or control signal, and responsively control motor 206 to stop moving. In examples where the operational member receives the power or control signal directly from a coupling member (i.e., without an intervening controller), the operational member may stop moving as a result of a lack of power being received from the power or control signal. As a result of the mechanical break of first screw 212, first current path 216 becomes open at first node 220, and a voltage increases to the same voltage level a power bus 204. A computing device may determine the mechanical break of first screw 212 based on the voltage increase at first node 220 and infer that movement of motor 206 is stopped. Accordingly, the computing device may control the system (e.g., an aerial vehicle, such as a UAV) based on the motor 206 and propeller 208 not moving. For example, the computing device may increase the speed of one or more motors that share a boom arm with motor 206 responsive to determining the mechanical break of first screw 212.

Figure 3A:
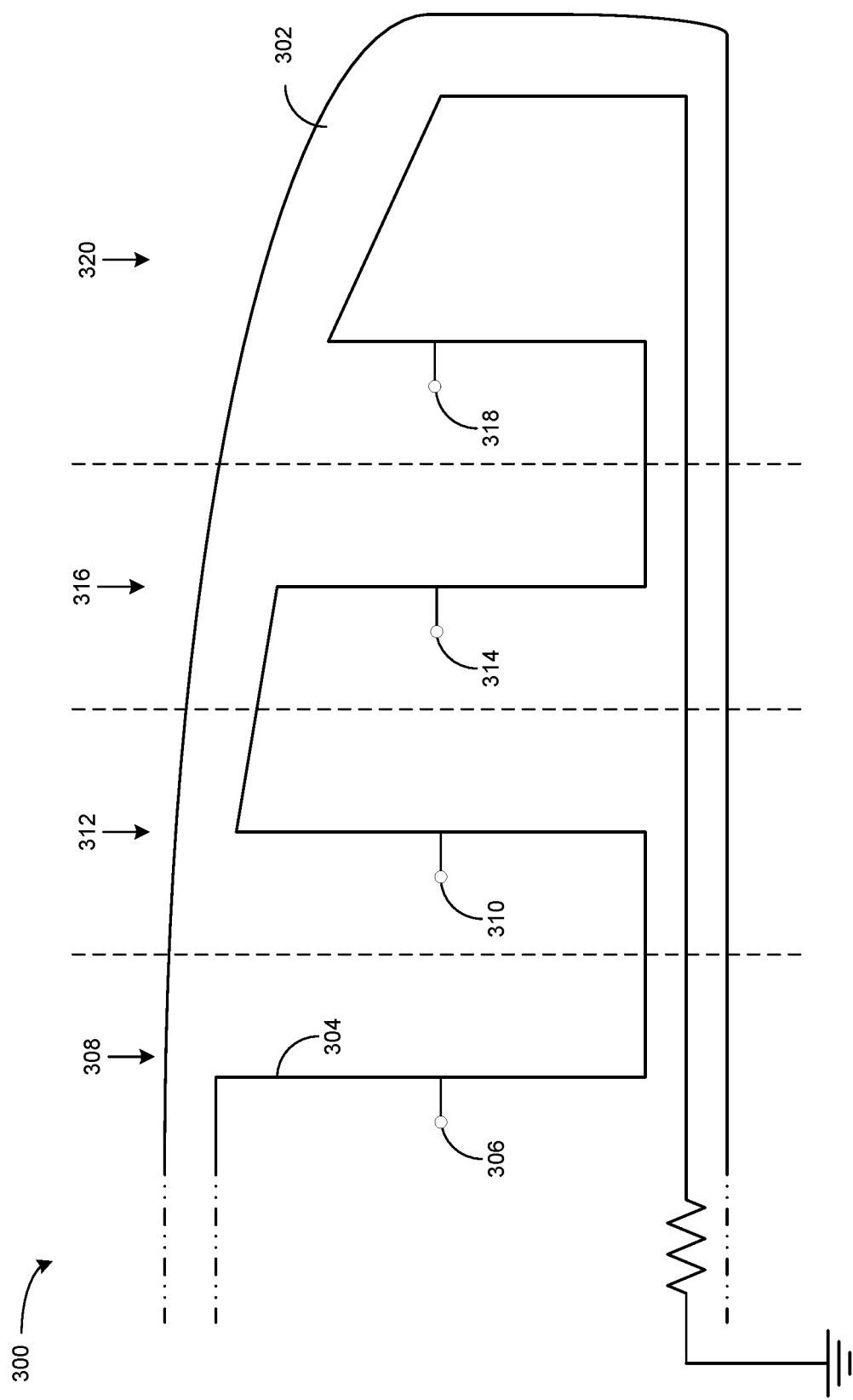
FIG. 3A is a simplified illustration of a structural member in a first state, according to an example.

FIG. 3A is a simplified illustration of a structural member in a first state, according to an example. In particular, FIG. 3A shows a structural member 300 that includes a wing 302. Wing 302 has one or more conductive features incorporated therein. In particular, a current path 304 is incorporated into wing 302. Current path 304 may be composed of a material with variable resistance depending on deflection and corresponding strain placed on the material. For example, current path 304 may include a metal, and an impact to wing 302 may have a piezoresistive effect on current path 304. In other words, resistivity may increase proportionally with the amount of strain on current path 304. Though current path 304 is shown with only a few turns, in practice, current path 304 may be wired more densely to increase detectability of the piezoresistive effect.

FIG. 3A further shows a plurality of nodes 306, 310, 314, and 318, which respectively correspond to regions 308, 312, 316, and 320 of wing 302. Detecting a voltage level at each given node may indicate how resistive the portion of current path 304 is in the corresponding region of wing 302. For example, the computing device can periodically sample voltage levels at each node and variations in the sampled voltage levels indicate a change in resistivity of current path 304 at one or more locations. In this manner, a computing device (e.g., computing device 102) can determine whether one or more of regions 308, 312, 316, and 320 sustains an impact. Within examples, responsive to detecting a change in resistivity at one of nodes 306, 310, 314, and 318, the computing device can schedule inspection or maintenance of wing 302 or a region thereof.

Figure 3B:
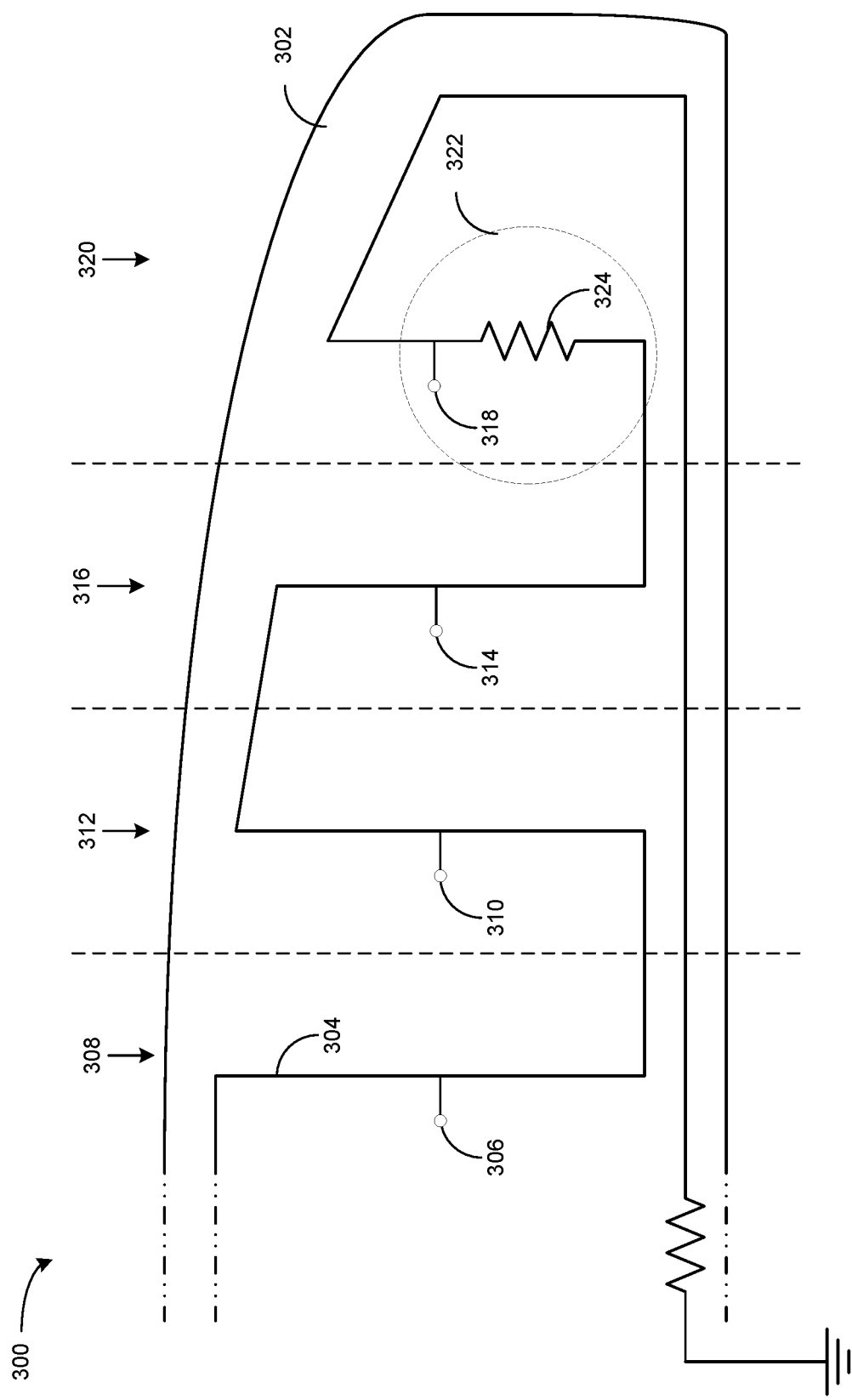
FIG. 3B is a simplified illustration of a structural member in a second state, according to an example.

FIG. 3B is a simplified illustration of a structural member in a second state, according to an example. In the second state, wing 302 has experienced an impact causing deflection of a surface of wing 302 in an area 322. Based on current path 304 being incorporated into the surface of wing 302, deflection in area 322 of wing 302 results in added strain on corresponding portions of current path 304, and thereby increases the resistance. This is represented for illustrative purposes by resistor 324. Based on this added resistance, voltage levels at 318 might change, and the computing device can determine that region 320 has sustained impact. For example, this may involve determining a resistivity of current path 304 within region 320 based on sampled voltage levels at node 318, calculating a corresponding strain on current path 304 in region 320, and inferring an amount of deflection in region 320 based on region 320. Determining that the resistivity remains at the higher level may imply that lasting damage has been sustained by wing 302 at region 320, and the computing device may responsively schedule maintenance of wing 302 based on this determination. Determining that the resistivity returns to a lower level may indicate the wing 302 sustained impact, but that no lasting damage was sustained, and the computing device may responsively schedule an inspection of wing 302 based on this determination.

Figure 4:
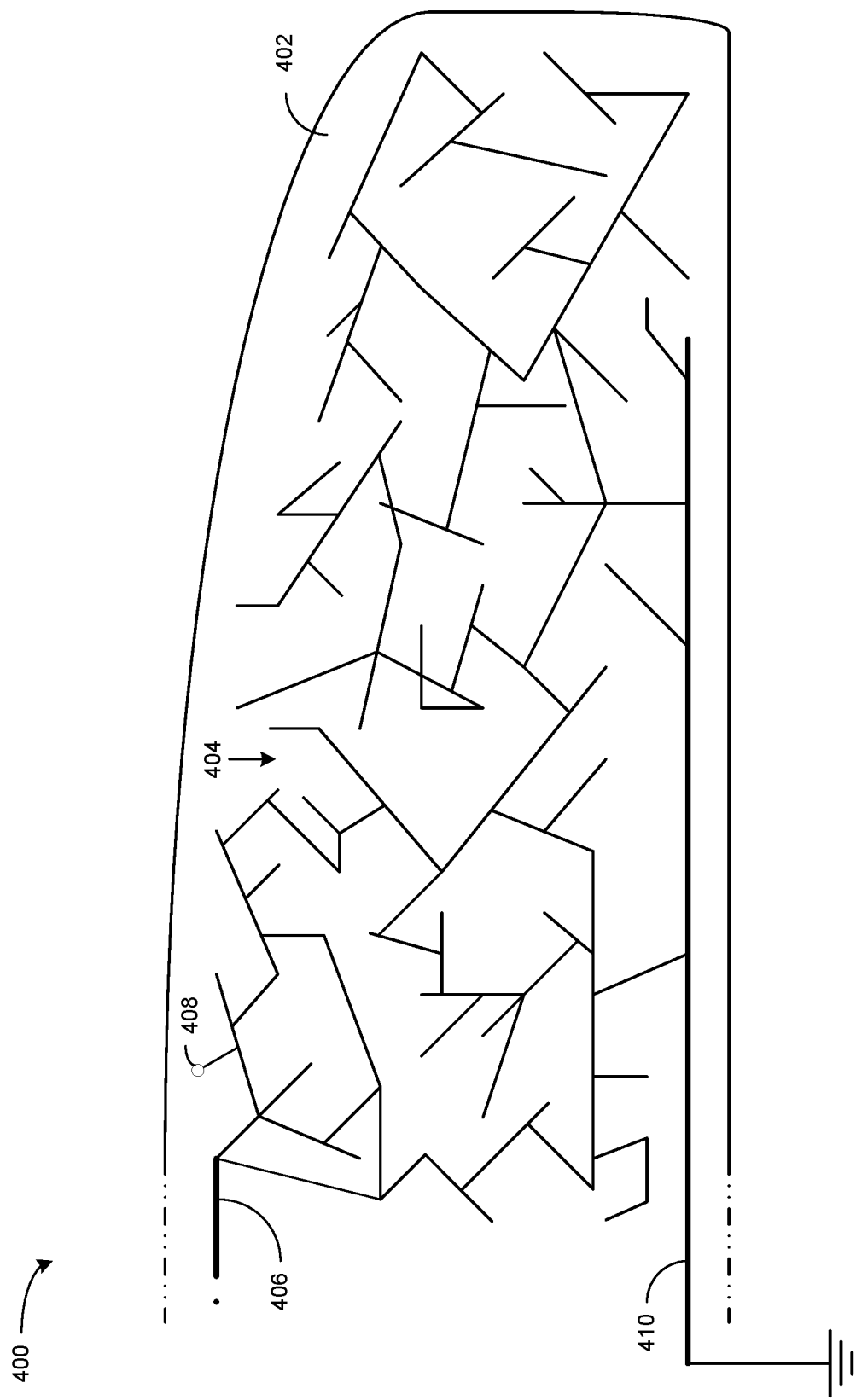
FIG. 4 is a simplified illustration of a structural member, according to an example.

FIG. 4 is a simplified illustration of a structural member, according to an example. In particular, FIG. 4 shows a top view of a structural member 400 including a wing 402. Within wing 402, a lattice 404 of conductive material is formed that can indicate whether an impact has been sustained by the wing 402, and thus whether inspection or maintenance of wing 402 is warranted. Thus, lattice 404 is another conductive feature that can be incorporated into a structural member. Lattice 404 can be a framework of interconnected electric leads (e.g., low-gauge wires) inserted during or prior to injection molding of wing 402. The lattice can be arranged in a manner that substantially fills three-dimensional space within wing 402. For example, the lattice can be inserted prior to, or concurrently with, a foam material being injected into wing 402, and, as the foam material cures, the lattice can be held in place. In some examples, the lattice may be arranged randomly in accordance with an injection process. In other examples, the lattice may be prefabricated to fit the empty space within structural member 400.

Structural member 400 also shows an input line 406, a sampling node 408, and a ground node 410. A computing device can periodically sample a voltage level at sampling node 408 and any other sampling nodes associated with lattice 404. Different sampling nodes may correspond to different sections of the lattice 404, so if an electrical lead in lattice 404 breaks and disconnects a section from the framework, this may be detected by sampling a corresponding sampling node. Based on detecting that one or more electrical leads has disconnected, the computing device may determine that wing 402 has sustained an impact significant enough to break an electrical lead in lattice 404, and responsively schedule inspection or maintenance of wing 402. In other examples, computing device may take other actions responsive to detecting a change in the lattice 404, such as grounding the aerial vehicle or altering a delivery schedule to expedite maintenance of the aerial vehicle. In some examples, detecting a change in the lattice may involve detecting a resistance level of lattice 404. For example, if an overall voltage level at sampling node 408 changes from a baseline voltage associated with an initial resistance of lattice 404 to a sampled voltage associated with an altered resistance of lattice 404, this may signify an impact to the wing 402.

Figure 5A:
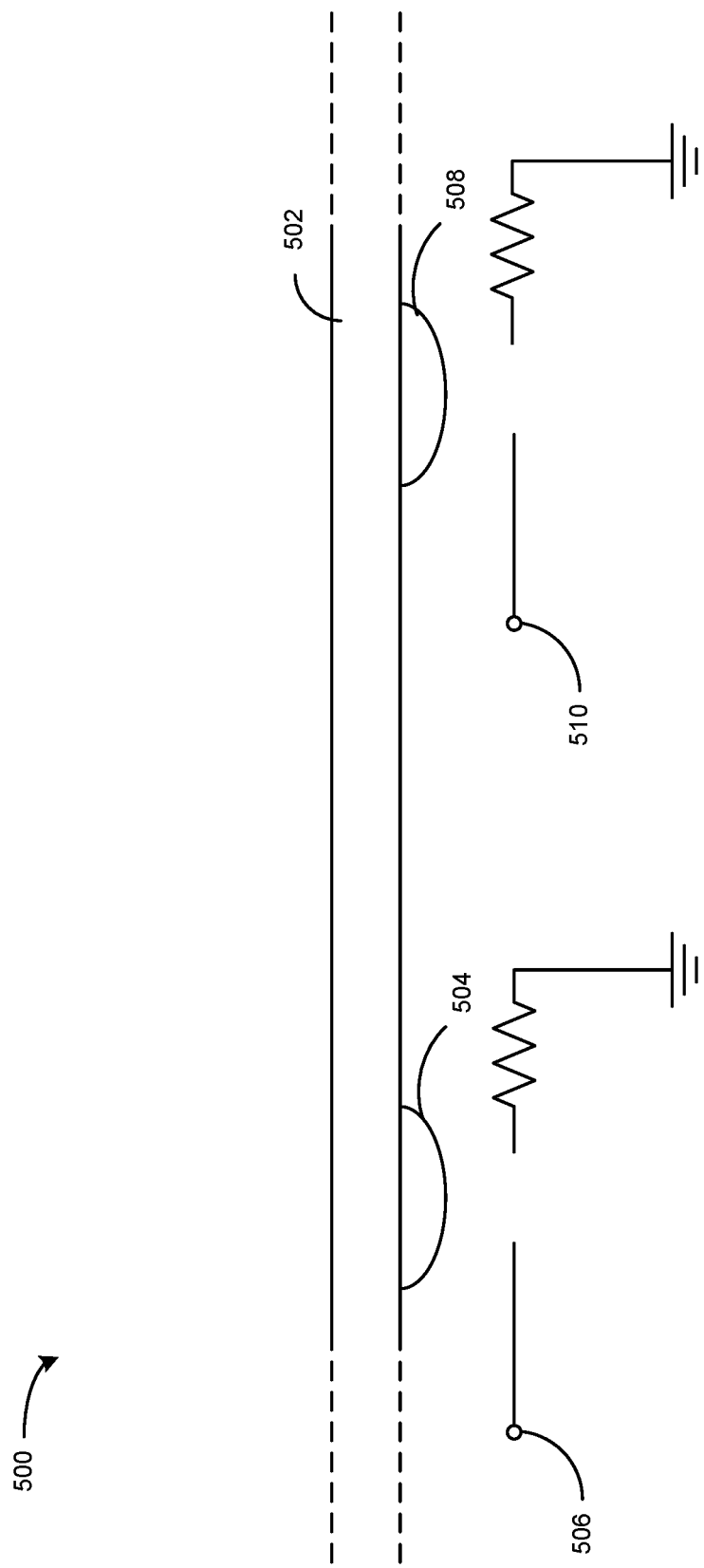
FIG. 5A is a simplified illustration of a structural member in a first state, according to an example.

FIG. 5A is a simplified illustration of a structural member in a first state, according to an example. In particular, FIG. 5A shows a side view of a structural member 500, at a first state in which structural member 500 has not been impacted. Structural member 500 includes a surface 502, a plurality of conductive features (including conductive features 504 and 508) integrated into structural member 500 on a bottom portion of the surface 502, and a plurality of contact nodes (including contact nodes 506 and 510) corresponding to the plurality of conductive features. The conductive features are situated such that, if surface 502 moves relative to the contact nodes, a conductive feature closes a circuit associated with a contact node such that a change in voltage is detectable at the contact node. An array of conductive features and corresponding contact nodes could be placed throughout different surfaces of a system to monitor the system for impacts and to schedule inspection and/or maintenance of structural members determined to have sustained an impact.

Figure 5B:
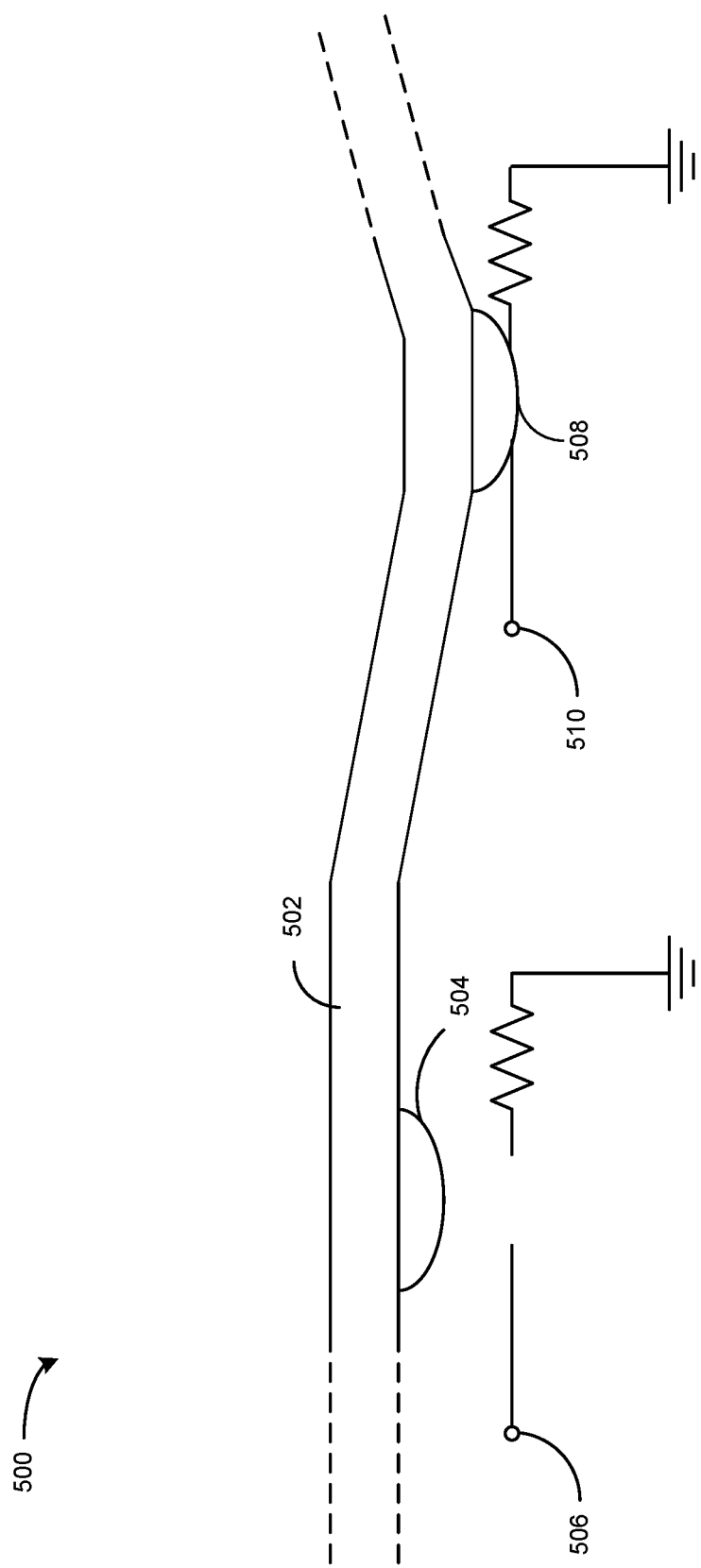
FIG. 5B is a simplified illustration of a structural member in a second state, according to an example.

FIG. 5B is a simplified illustration of a structural member in a second state, according to an example. In particular, FIG. 5B shows a side view of a structural member 500 at a second state at which structural member 500 has been impacted. In the second state, conductive surface 502 has moved due to an impact and conductive feature 508 correspondingly has moved towards contact node 510. Based on surface 502 moving, conductive feature 508

Though, in FIGS. 3A, 3B, 4, 5A, and 5B, a wing is depicted as being a structural member, other structural members could be used, such as a boom arm, or a fuselage. Further, similar functionality could be implemented in other types of systems, such as with land vehicles, water vehicles, free-standing structures, and other systems. Further, though the use of conductive features integrated into structural members are described in terms of detecting an impact, other states of such structural members are detectable using integrated conductive features. For example, bending, twisting, or other relative movement can be detected using such conductive features.

Figure 6:
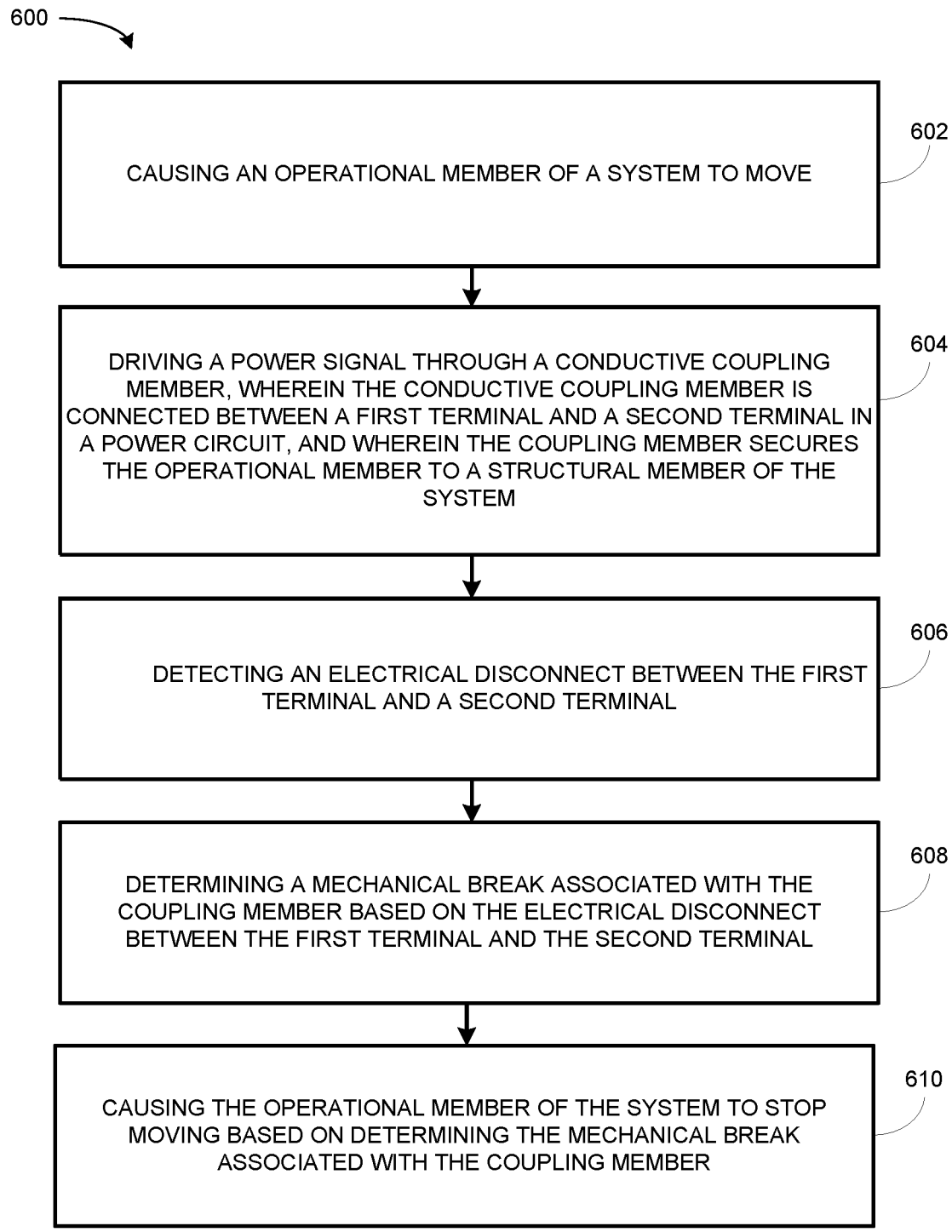
FIG. 6 is a block diagram of a method, according to an example.

FIG. 6 is a block diagram of a method, according to an example. In particular, FIG. 6 shows a method 600. Method 600 may be carried out by any of the systems described above, including those illustrated in FIG. 1, 2A, 2B, 3A, 3B, 4, 5A, or 5B.

In addition, for the method shown in FIG. 6 and other processes and methods disclosed herein, the flowchart shows functionality and operation of one possible implementation of present embodiments. In this regard, some blocks may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method and other processes and methods disclosed herein, each block in FIG. 6 may represent circuitry that is wired to perform the specific logical functions in the process.

At block 602, method 600 includes causing an operational member of a system to move. For example, this may involve providing power from a power source to an operational member of a system, such as a motor.

At block 604, method 600 includes driving a power or control signal through a conductive coupling member (e.g., a screw or a rivet). The conductive coupling member is connected between a first terminal and a second terminal in a power circuit, and the coupling member secures the operational member to a structural member of the system. For example, in an aerial vehicle, the structural member can be a boom arm, a wing, or a fuselage.

At block 606, method 600 includes detecting an electrical disconnect between the first terminal and a second terminal. For examples, this may involve sampling a voltage level at a node in the power circuit to detect a change in voltage from a first level to a second level. This may be performed in accordance with the operations described in relation to FIG. 5B.

At block 608, method 600 includes determining a mechanical break associated with the coupling member based on the electrical disconnect between the first terminal and the second terminal. For example, this may involve a controller of the operational member detecting the mechanical break based on no longer receiving the power or control signal, or a computing device of the system detecting the mechanical break based on the change in voltage level detected at the node in the power circuit.

At block 610, method 600 includes causing the operational member of the system to stop moving based on determining the mechanical break associated with the coupling member. For example a controller of the operational member or a central controller of the system (e.g., computing device 402) may cause the operational member to stop moving responsive to detecting the mechanical break.

Within examples, the electrical disconnect corresponds to a failure detection loop (e.g., first current path 516 shown in FIGS. 5A and 5B) for the operational member being open, In these examples, determining the mechanical break can include determining a voltage increase at the first terminal corresponding to the failure detection loop being open. For example, this may be performed in accordance with operations described in relation to FIG. 5B.

Within examples, the power or control signal includes a pulse-width-modulation (PWM) signal or a Controller Area Network (CAN) signal that serves as an input to a controller of the operational member. In these examples, detecting the electrical disconnect includes detecting, by the controller of the operational member, that the PWM signal is not received.

Within examples, method 600 further includes changing operation of one or more other operational members based on causing the operational member to stop moving. In these examples, the failure detection loop can be associated with a type of operational member (e.g., a motor), and changing the operation of the one or more other operational members is based on the type of operational member. For example, the operational member can be a motor, and a central controller of the system (e.g., computing device 402) can cause one or more additional motors of the system to increase speed to make up for a lack of lift supplied by the motor.

Within examples, method 600 includes determining the mechanical break based on a vibration profile of the structural member. For example, a motor being unsecured may cause vibration of a boom arm, which can be detectable by a central controller of the system using one or more vibration sensors. Method 600 can further include corroborating the vibration profile based on the failure detection loop being open. Thus, the failure detection loop can be leveraged to increase a confidence level of sensing the operational member being unsecured or to expedite detecting the operational member being unsecured.

Within examples, method 600 further includes updating a maintenance schedule of the system based on the failure detection loop being open. For example, because the failure detection loop can signify the mechanical break of the coupling member, a central controller of the system can schedule maintenance of the coupling member and perhaps a corresponding structural member and/or operational member.

Within examples, method 600 further includes altering a planned flight of the aerial vehicle responsive to determining the mechanical break. For example, this can include causing an emergency landing of the aerial vehicle or choosing a less challenging profile for the aerial vehicle.

Other functionality described above with respect to FIG. 1, 2A, 2B, 3A, 3B, 4, 5A, or 5B can be included within method 600 as well. Further, aspects of method 700 described below in relation to FIG. 7 can replace, be combined with, or supplement aspects of method 600.

Figure 7:
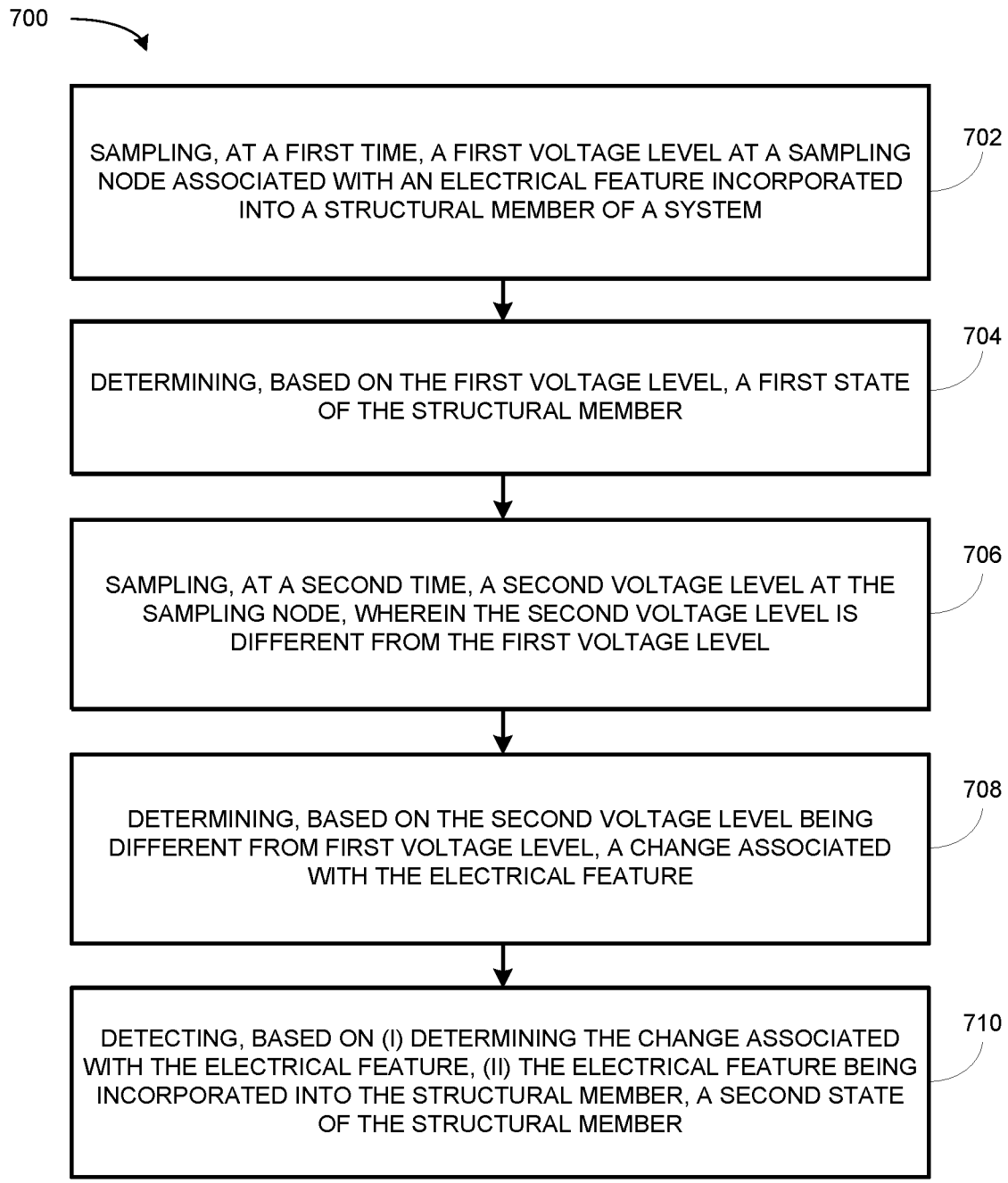
FIG. 7 is a block diagram of a method, according to an example.

FIG. 7 is a block diagram of a method, according to an example. In particular, FIG. 7 shows a method 700. Method 700 may be carried out by any of the systems described above with regard to FIG. 1, 2A, 2B, 3A, 3B, 4, 5A, or 5B.

In addition, for the method shown in FIG. 7 and other processes and methods disclosed herein, the flowchart shows functionality and operation of one possible implementation of present embodiments. In this regard, some blocks may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method and other processes and methods disclosed herein, each block in FIG. 7 may represent circuitry that is wired to perform the specific logical functions in the process.

At block 702, method 700 includes sampling, at a first time, a first voltage level at a sampling node associated with an conductive feature incorporated into a structural member of a system. For example, this may be performed in accordance with FIGS. 6A, 7, and 8A and the corresponding descriptions thereof.

At block 704, method 700 includes determining, based on the first voltage level, a first state of the structural member. For example, this may be performed in accordance with FIGS. 6A, 7, and 8A and the corresponding descriptions thereof.

At block 706, method 700 includes sampling, at a second time, a second voltage level at the sampling node, wherein the second voltage level is different from the first voltage level. For example, this may be performed in accordance with FIGS. 6B, 7, and 8B and the corresponding descriptions thereof.

At block 708, method 700 includes determining, based on the second voltage level being different from first voltage level, a change associated with the conductive feature. For example, this may be performed in accordance with FIGS. 6B, 7, and 8B and the corresponding descriptions thereof.

At block 710, method 700 includes detecting, based on (i) determining the change associated with the conductive feature, (ii) the conductive feature being incorporated into the structural member, a second state of the structural member. For example, this may be performed in accordance with FIGS. 3B, 4, and 5B and the corresponding descriptions thereof.

Other functionality described above with respect to FIG. 1, 2A, 2B, 3A, 3B, 4, 5A, or 5B can be included within method 700 as well. Further, aspects of method 600 described above in relation to FIG. 6 can replace, be combined with, or supplement aspects of method 700.

VI. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. An aerial vehicle comprising:
    a power circuit;
    an operational member configured to move responsive to receiving a power or control signal from the power circuit;
    a structural member configured to stabilize one or more operational members of the aerial vehicle; and
    a coupling member configured to secure the operational member to the structural member at a contact point, wherein the coupling member comprises a conductive material incorporated into the power circuit between a first terminal and a second terminal, and wherein a mechanical break of the coupling member results in:
        (i) the operational member becoming unsecured from the structural member at the contact point; and
        (ii) an electrical disconnect between the first terminal and the second terminal, wherein the electrical disconnect stops the power or control signal and thereby stops the operational member from moving.

2. The aerial vehicle of claim 1, wherein the coupling member comprises a screw, and wherein the mechanical break corresponds to one or more of stripped threads associated with the screw, a shearing break of the screw, and the screw pulling through the structural member.

3. The aerial vehicle of claim 2, wherein the operational member comprises a motor configured to move a propeller, wherein the structural member comprises a boom arm, wherein the stripped threads associated with the screw result in:

(i) the motor becoming unsecured from the boom arm, and (ii) the electrical disconnect such that the propeller stops moving.

4. The aerial vehicle of claim 1, wherein the power circuit comprises a power bus connected to a power source, wherein the first terminal is connected to the power bus, wherein the second terminal is connected to a power input of the operational member, wherein the power or control signal comprises an input voltage received from the power bus via the structural member, and wherein the mechanical break results in the second terminal being disconnected from the input voltage.

5. The aerial vehicle of claim 1, wherein the operational member comprises a controller configured to receive the power or control signal, wherein the power or control signal serves as an input to the controller that causes the controller to control movement of the operational member, and wherein the electrical disconnect corresponds to an input that causes the controller to stop the operational member from moving.

6. The aerial vehicle of claim 1, further comprising a computing device, wherein the power circuit comprises a failure detection loop, wherein the electrical disconnect corresponds to the failure detection loop being open, and wherein the computing device is configured to detect the mechanical break based on the failure detection loop being open.

7. The aerial vehicle of claim 6, wherein the computing device is further configured to:
cause the operational member to stop moving responsive to detecting the mechanical break; and
change operation of one or more other operational members based on causing the operational member to stop moving.

8. The aerial vehicle of claim 7, wherein the failure detection loop is associated with a type of operational member, and wherein changing the operation of the one or more other operational members is based on the type of operational member.

9. The aerial vehicle of claim 6, wherein the computing device is further configured to determine the mechanical break based on a vibration profile of the structural member; and
to corroborate the vibration profile based on the failure detection loop being open.

10. The aerial vehicle of claim 6, wherein the computing device is further configured to update a maintenance schedule of the aerial vehicle based on the failure detection loop being open.

11. The aerial vehicle of claim 6, wherein the computing device is further configured to alter a planned flight of the aerial vehicle responsive to determining the mechanical break.

12. A method comprising:
causing an operational member of a system to move;
driving a power or control signal through a conductive coupling member, wherein the conductive coupling member is connected between a first terminal and a second terminal in a power circuit, and wherein the coupling member secures the operational member to a structural member of the system;
detecting an electrical disconnect between the first terminal and a second terminal;
determining a mechanical break associated with the coupling member based on the electrical disconnect between the first terminal and the second terminal; and
causing the operational member of the system to stop moving based on determining the mechanical break associated with the coupling member.

13. The method of claim 12, wherein the electrical disconnect corresponds to a failure detection loop for the operational member being open, and wherein determining the mechanical break comprises determining a voltage increase at the first terminal corresponding to the failure detection loop being open.

14. The method of claim 12, wherein the power or control signal comprises a pulse-width-modulation (PWM) signal or a Controller Area Network (CAN) signal that serves as an input to a controller of the operational member, and wherein detecting the electrical disconnect comprises detecting, by the controller of the operational member, that the PWM signal or CAN signal is not received.

15. The method of claim 12, further comprising:
changing operation of one or more other operational members based on causing the operational member to stop moving.

16. The method of claim 15, wherein the failure detection loop is associated with a type of operational member, and wherein changing the operation of the one or more other operational members is based on the type of operational member.

17. The method of claim 12, further comprising:
determining the mechanical break based on a vibration profile of the structural member; and
corroborating the vibration profile based on the failure detection loop being open.

18. The method of claim 12, further comprising:
updating a maintenance schedule of the system based on the failure detection loop being open.

19. A system comprising:
a power circuit;
a plurality of operational members configured to move responsive to receiving respective power or control signals from the power circuit;
one or more structural members configured to stabilize the plurality of operational members; and
a plurality of coupling members configured to secure the plurality of operational members to the one or more structural members at a plurality of contact points, wherein each respective coupling member of the plurality of coupling members comprises a conductive material incorporated into the power circuit between a respective first terminal and a respective second terminal, and wherein a mechanical break of a respective coupling member results in:
(i) a respective operational member corresponding to the respective coupling member becoming unsecured from a corresponding structural member at a corresponding contact point; and
(ii) an electrical disconnect between the respective first terminal and the respective second terminal, wherein the electrical disconnect stops a respective power or control signal from reaching the respective operational member and thereby stops the respective operational member from moving.

20. The system of claim 19, further comprising a power source, wherein the power circuit comprises a power bus connected to the power source, wherein each respective first terminal is connected to the power bus, wherein each respective second terminal is connected to a power input of a corresponding operational member, wherein each respective power or control signal comprises an input voltage received from the power bus via a corresponding structural member, and wherein the mechanical break results in the respective second terminal being disconnected from the input voltage.

* * * * *